(12) United States Patent
Kraus

(10) Patent No.: US 7,578,413 B2
(45) Date of Patent: Aug. 25, 2009

(54) SINGLE-PIECE SEALING COVER

(75) Inventor: Willibald Kraus, Grünstadt (DE)

(73) Assignee: TRW Automotive Electronics & Components GmbH & Co. KG, Radolfzell (DE)

( * ) Notice: Subject to any disclaimer, the term of this patent is extended or adjusted under 35 U.S.C. 154(b) by 178 days.

(21) Appl. No.: 10/512,397

(22) PCT Filed: Mar. 20, 2003

(86) PCT No.: PCT/DE03/00935

§ 371 (c)(1),
(2), (4) Date: May 31, 2005

(87) PCT Pub. No.: WO03/089288

PCT Pub. Date: Oct. 30, 2003

(65) Prior Publication Data

US 2005/0206094 A1    Sep. 22, 2005

(30) Foreign Application Priority Data

Apr. 22, 2002    (GB) .................. 202 06 393.3 U

(51) Int. Cl.
*B65D 39/00* (2006.01)
(52) U.S. Cl. ............... 220/789; 220/790; 220/792; 220/794; 138/89
(58) Field of Classification Search .......... 220/789, 220/790, 792, 794, DIG. 19; 215/355; 138/89
See application file for complete search history.

(56) References Cited

U.S. PATENT DOCUMENTS 4,646,932 A * 3/1987 Masler ................ 220/789
4,760,935 A   8/1988 Van den Beld et al.
5,071,022 A * 12/1991 Sick .................... 220/789

FOREIGN PATENT DOCUMENTS

| DE | 31 42 850 A1 | 5/1983 |
| DE | 35 12 582 A1 | 10/1986 |
| DE | 37 135 03 C1 | 1/1988 |
| DE | 201 07 612 U1 | 11/2001 |

* cited by examiner

*Primary Examiner*—Anthony D Stashick
*Assistant Examiner*—Christopher B McKinley
(74) *Attorney, Agent, or Firm*—Fay Sharpe LLP

(57) ABSTRACT

The invention relates to a single-pieced sealing cover (1) made of a thermoplastic elastomer, especially used to seal an opening (22,22', 22"), comprising a base body (5) with an adjacent peripheral collar (7) which turns into at least one elastic sealing lip adjacent to one side of a carrier (10, 10'). The collar (7) comprises at least one detent ring (12) located opposite the at least one sealing lip (10, 10'). The invention is characterized in that the collar (7) is connected to the sealing lip (10, 10') by means of an intermediate area (14) extending parallel to a covering surface (F) of the carrier (20, 20', 20"), whereupon the detent ring (12) protrudes into an inner area (21) formed by the intermediate area (14) and the sealing lip (10, 10') and an outer area of the sealing lip (10, 10') can be glued to the covering surface (F) of the carrier (20, 20', 20").

6 Claims, 2 Drawing Sheets

Figure 4:
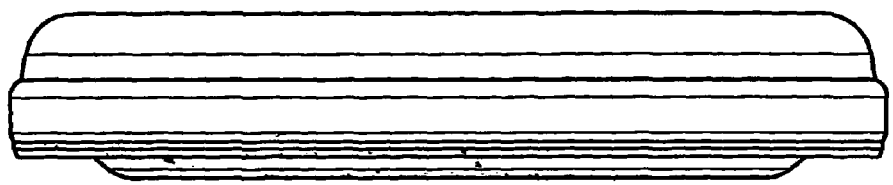

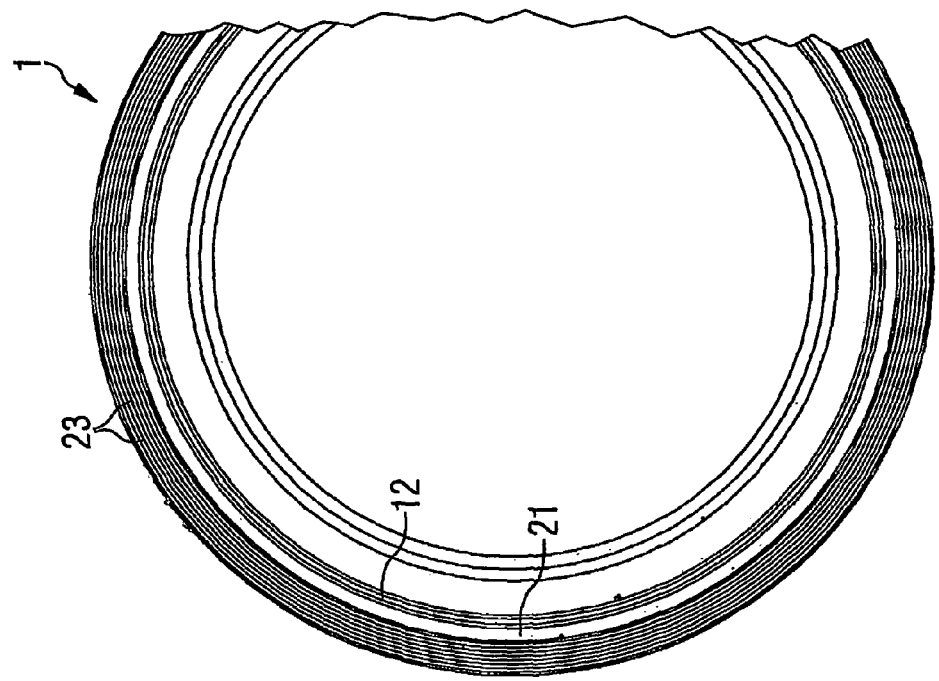
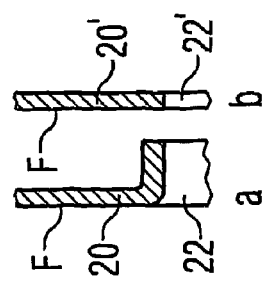
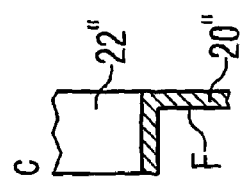
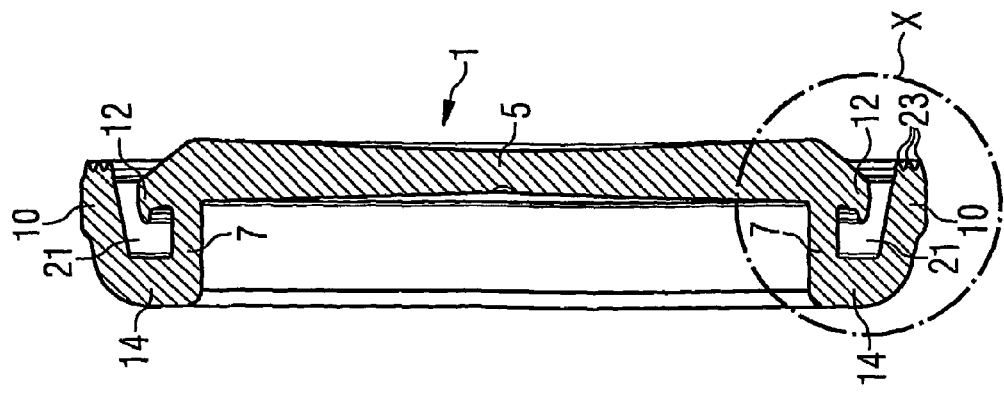

SINGLE-PIECE SEALING COVER

The invention relates to a single-pieced sealing cover made of a thermoplastic elastomer, especially used to seal an opening in a support, comprising a base body, with an adjacent peripheral collar, according to the preamble of claim 1.

Sealing covers of this kind (DE 35 12 582 C3, DE 37 13 503 C1) are already known as state of the art. These sealing covers respectively present an elastic sealing lip, and—opposite to same—one or several detent rings. As a result thereof; in mounted state, perfect sealing is to be assured, in addition to excellent holding property in a support. In order to satisfy the aforementioned requirements in such known constructions, it is a drawback that it is necessary to have available different sealing covers for different designs of the support in the area of its opening.

Thus, the present invention is based on the object of creating a sealing cover of the initially mentioned type which will ensure secure and effective sealing of said support opening regardless of the design of the area of the support opening.

Said object is solved according to the invention in that the collar is joined with the sealing lip by means of an intermediate area extending parallel vis-a-vis a covering surface of the support, so that the detent ring protrudes into an interior space formed by the intermediate area and the sealing lip, and that an exterior area of the sealing lip can be glued to the cover surface of the support.

By means of the combined effect of these individual characteristics, a sealing cover of novel design is created which facilitates significant reduction in parts and which permits, due to the specifically employed thermoplastic elastomer, gluing to the cover surface in the area of the support opening. In addition to simple installation, this results in perfect sealing of the respective support opening.

In further embodiment of the invention, the sealing lip can, to a large extent, cover the detent ring.

According to a specific embodiment of the invention, there exists the possibility of the sealing lip presenting frontally, as exterior area, several serrated ribs, which can be glued to the covering surface of the support. These serrated ribs, in interaction with the detent ring, ensure secure sealing of the respective support opening, regardless of its configuration.

Alternatively there also exists the possibility of the sealing lip being designed in conically tapering fashion vis-a-vis the covering surface of the support and that it can be glued together with same, resulting in the identical aforementioned effects.

The detent ring can lie in the plane of the base body and present an impact lip in front. Furthermore, there exists the possibility that the outer surfaces of the sealing lip and the detent ring are inclined towards each other. Adjacent to the outer surface of the detent ring there may be an area which changes over into the impact lip, said area presenting the same inclination as the outer surface of the sealing lip and, more particularly, the are extends substantially in parallel with the outer surface of the sealing lip.

Figure 5:
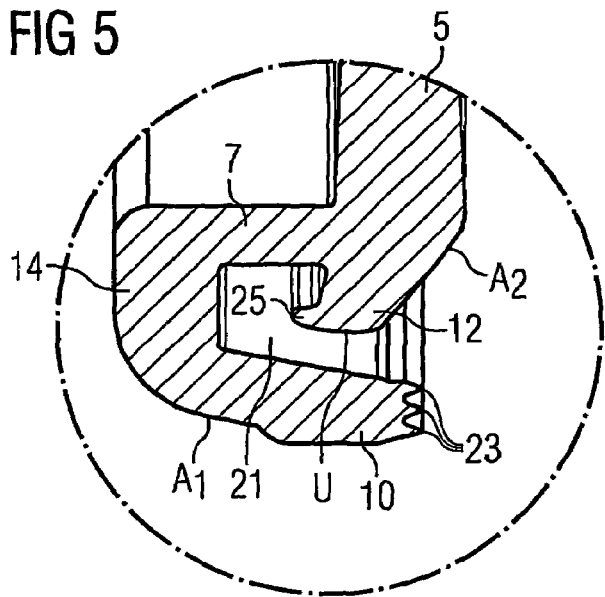
Figure 6:
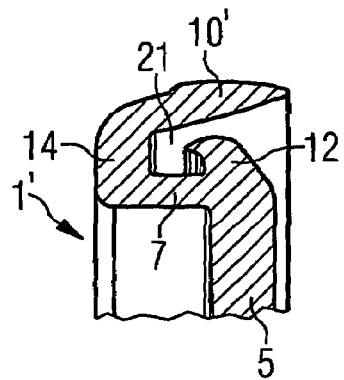

The invention is described in detail below by means of exemplary embodiments represented in the drawing. The drawing shows the following:

FIG. 1 a center section through the invention-specific sealing cover in a first specific embodiment, FIG. 2a,b,c various design possibilities of the support opening in center section, partially refracted, FIG. 3 a bird's eye view of the sealing cover according to FIG. 1, partially refracted, FIG. 4 a lateral view of the sealing cover according to FIGS. 1 and 3, partially refracted, FIG. 5 an enlarged view of the area X according to FIG. 1, FIG. 6 another embodiment possibility of the invention in the area of the sealing lip, in center section, partially refracted.

A single-piece sealing cover 1 is depicted in FIGS. 1, 3, 4 and 5, made of a thermoplastic elastomer. Said sealing cover specifically serves for sealing an opening 22 or 22' or 22" of a support shown schematically in FIG. 2. Said support, according to FIG. 2a, can present an outwardly oriented collar, according to FIG. 2b it can extend flat, and according to FIG. 2c, it can have an inwardly oriented collar. With the aid of the invention-specific sealing cover, there now exists the possibility of installing same in perfect fashion, even with differently designed supports 20, 20' or 20", in the area of the respective opening, and to seal said opening.

The sealing cover 1 presents a base body 5, with an adjacent peripheral collar 7. The peripheral collar 7 passes over into at least one elastic sealing lip 10 abutting against one side of the support, whereby the collar 7 presents at least one detent ring 12, positioned opposite the sealing lip 10.

As is especially apparent from FIGS. 1 and 5, collar 7 is connected with the sealing lip 10 by means of an intermediate area 14 extending parallel to a covering surface F (FIG. 2) of the support 20, 20', 20". Beyond that, the detent ring 12 protrudes into an interior space 21, formed by the intermediate area 14 and the sealing lip 10, as is specifically evident from FIG. 5.

According to the invention, an outer area of the sealing lip 10 can now be glued to the covering surface F of the support 20, 20', 20".

It is apparent from FIG. 1, that the sealing lip 10 largely covers the detent ring 12. In addition, in the specific embodiments according to FIGS. 1 and 5, the sealing lip 10 presents several serrated ribs 23 in front as exterior area, which can be glued to the covering surface F of the respective support.

The detent ring 12 according to FIGS. 1 and 5 lies in the plane of the base body 5 and presents, frontally, an impact lip 25. It is specifically apparent from FIG. 5 that the outer surfaces $A_1$, $A_2$ of the sealing lip 10 and the detent ring 12 are inclined towards each other. According to the invention there also exists the possibility in this case that adjacent to the outer surface $A_2$ of the detent ring 12 there extends is an area U, which changes over into the impact lip 25, said area U presenting somewhat the same inclination as the outer surface $A_1$ of the sealing lip 10 and, as shown in the drawings, the area U and outer surface $A_1$ extend substantially in parallel with each other.

If a support 20 is present according FIG. 2a with a correspondingly shaped collar, the sealing lip 10 with serrated ribs 23 impinges upon the area F of the support, while the detent ring 12 with impact lip 25 overgrips the respective collar of the support 20.

With a support 20' according to FIG. 2b, the elastic sealing lip 10 with serrated ribs 23 impinges upon the area F of support 20', whereas the detent ring 12 with impact lip 25 overcovers the other side of the support and both elements are glued together.

If a support 20" with an opening 22" exists, the respective collar positions itself again into the interior space 21 of the sealing cover 1, whereby the elastic sealing lip with its serrated ribs 23 is likewise glued together with the area F of support 20".

Instead of the specific embodiment according to FIGS. 1 and 5, in which the elastic sealing lip 10 presents several serrated ribs 23, there also exists the possibility according to FIG. 6 that in this case the elastic sealing lip 10' is designed in conically tapering fashion towards the covering surface F of support 20, 20', 20" and is cementable with same.

By virtue of the design of the interior space 21, the particular shape of the sealing lip 10 or 10' and of the detent ring 12 and due to the special selection of material in that the sealing cover is made of a thermoplastic material, there is assurance, by simple means, of significant reduction of parts in the design of the sealing cover.

The invention claimed is:

1. A single-piece sealing cover made of a thermoplastic elastomer for sealing an opening in an associated support, the sealing cover comprising a base body with an adjacent peripheral collar, at least one elastic sealing lip having an outer surface and abutting against one side of the associated support, the collar presenting at least one detent ring located opposite the sealing lip, the collar being connected with the sealing lip via an intermediate area, wherein the detent ring includes an outer surface which protrudes into an interior space formed by the intermediate area and the sealing lip and further includes an impact lip at one end and an area adjacent the impact lip, the intermediate area extends parallel to a covering surface of the support, and an outer area of the sealing lip is connected with the covering surface of the associated support by means of several serrated ribs, the ribs being aligned with each other so that they have the same orientation and extend only within a volume of space defined between opposed inner and outer side walls of the sealing lip.

2. The sealing cover according to claim 1, wherein the detent ring lies in the plane of the base body.

3. The sealing cover according to claim 1 wherein the outer surfaces of the sealing lip and the detent ring are inclined towards each other.

4. The sealing cover according to claim 3, wherein said area of the detent ring has the same inclination as the outer surface of the sealing lip.

5. The sealing cover of claim 1 wherein the ribs have the same shape.

6. The sealing cover of claim 1 wherein the ribs have an identical size.

* * * * *

UNITED STATES PATENT AND TRADEMARK OFFICE
CERTIFICATE OF CORRECTION

| | | |
|---|---|---|
| PATENT NO. | : 7,578,413 B2 | Page 1 of 1 |
| APPLICATION NO. | : 10/512397 | |
| DATED | : August 25, 2009 | |
| INVENTOR(S) | : Willibald Kraus | |

It is certified that error appears in the above-identified patent and that said Letters Patent is hereby corrected as shown below:

On the Title Page Item (30), Foreign Application Priority Data should read as follows:

Apr. 22, 2002    (DE) ............................................... 202 06 393.3 U

Signed and Sealed this

Twenty-seventh Day of October, 2009

David J. Kappos
*Director of the United States Patent and Trademark Office*